(12) United States Patent
Doyle

(10) Patent No.: US 7,151,444 B1
(45) Date of Patent: Dec. 19, 2006

(54) CHILDREN'S MONITOR FOR MONITORING MULTIPLE CHILDREN AND METHOD

(76) Inventor: David M. Doyle, 728 Mockingbird Dr., Murphy, TX (US) 75094

(*) Notice: Subject to any disclaimer, the term of this patent is extended or adjusted under 35 U.S.C. 154(b) by 176 days.

(21) Appl. No.: 11/064,199

(22) Filed: Feb. 23, 2005

(51) Int. Cl.
*G08B 1/08* (2006.01)
*H04Q 7/00* (2006.01)

(52) U.S. Cl. .............. 340/539.1; 340/539.15; 340/573.1; 340/815.4

(58) Field of Classification Search .......... 340/539.1, 340/539.15, 573.1, 691.1, 691.2, 691.4, 691.6, 340/815.4, 815.46, 815.69; 381/94.1, 104; 455/73
See application file for complete search history.

(56) References Cited

U.S. PATENT DOCUMENTS

| | | | |
|---|---|---|---|
| 5,210,532 A | 5/1993 | Knoedler | |
| 5,280,635 A | 1/1994 | Knoedler | |
| 5,512,880 A | 4/1996 | Abrams | |
| 5,768,696 A | 6/1998 | Law | |
| 5,774,038 A | 6/1998 | Welch | |
| 5,991,637 A | 11/1999 | Mack, II | |
| 6,011,477 A | 1/2000 | Teodorescu | |
| 6,043,747 A | 3/2000 | Altenhofen | |
| 6,054,926 A | 4/2000 | Deleo | |
| 6,091,329 A | 7/2000 | Newman | |
| 6,150,941 A | 11/2000 | Geiger | |
| 6,462,664 B1 | 10/2002 | Cuijpers | |
| 6,518,889 B1* | 2/2003 | Schlager et al. ......... | 340/573.1 |
| 6,593,851 B1 | 7/2003 | Bornstein | |
| 6,759,961 B1* | 7/2004 | Fitzgerald et al. ....... | 340/573.1 |
| 7,088,259 B1* | 8/2006 | Armbruster et al. ... | 340/815.46 |
| 2002/0101350 A1 | 8/2002 | Thompson | |
| 2003/0122676 A1 | 7/2003 | Cuijpers | |
| 2004/0157555 A1 | 8/2004 | Richenstein | |
| 2004/0246136 A1 | 12/2004 | Sanoner | |
| 2004/0257233 A1 | 12/2004 | Proebsting | |
| 2005/0035864 A1 | 2/2005 | Fitzgerald | |
| 2006/0103522 A1* | 5/2006 | Spencer ................. | 340/539.15 |

OTHER PUBLICATIONS

Safety 1st, "Home Connection Monitor System—User Guide", 2004, pp. 1-10.

* cited by examiner

*Primary Examiner*—Toan N. Pham

(57) ABSTRACT

A method for monitoring multiple children includes receiving a plurality of signals from a plurality of transmitters, where each of the signals includes audio information. The method also includes extracting the audio information from each of the plurality of signals and simultaneously presenting the audio information from each of the plurality of signals to a user. In addition, the method includes simultaneously providing a plurality of visual indications. Each of the visual indications corresponds to an energy level of the audio information associated with one of the plurality of signals.

20 Claims, 6 Drawing Sheets

CHILDREN'S MONITOR FOR MONITORING MULTIPLE CHILDREN AND METHOD

TECHNICAL FIELD

This disclosure relates generally to children's monitors such as baby monitors. More specifically, this disclosure relates to a children's monitor for monitoring multiple children and method.

BACKGROUND

Children's monitors are often used to remotely monitor the behavior and activities of children. For example, baby monitors are often used in nurseries to monitor whether babies and young children are sleeping. Conventional baby monitors include a transmitter in one location (such as a nursery) and a receiver in another location (such as a parent's bedroom).

Conventional transmitters are typically capable of transmitting audio information over radio frequency or other wireless signals. Some conventional transmitters are capable of transmitting audio information over one of multiple frequencies, where the frequency is selectable by a user. This allows, for example, the user to select a different frequency when the current frequency is suffering from interference.

Conventional receivers are typically capable of receiving the wireless signals and presenting the audio information through a speaker. Some conventional receivers include visual indicators, which identify the "loudness" or energy level of the received audio information. For example, a visual indicator may have a lower intensity or produce less light when a baby is making quiet noises and a higher intensity or produce more light when the baby is crying. Some conventional receivers are also capable of receiving audio information over one of multiple frequencies, where the frequency is selectable by a user.

Conventional transmitters are often left on all of the time. This may, for example, allow neighbors or other people to listen to what occurs in a child's bedroom. Also, conventional receivers are usually capable of effectively receiving audio information from a single transmitter. While multiple transmitters could transmit audio information on the same frequency, the transmissions often interfere with one another. As a result, the audio information from multiple transmitters may be scrambled or not easily understandable. This may, for example, make it difficult to quickly identify which of multiple children is crying or otherwise making noise.

BRIEF DESCRIPTION OF THE DRAWINGS

For a more complete understanding of this disclosure, reference is now made to the following description, taken in conjunction with the accompanying drawings, in which.

DETAILED DESCRIPTION OF EXAMPLE EMBODIMENTS

Figure 1:
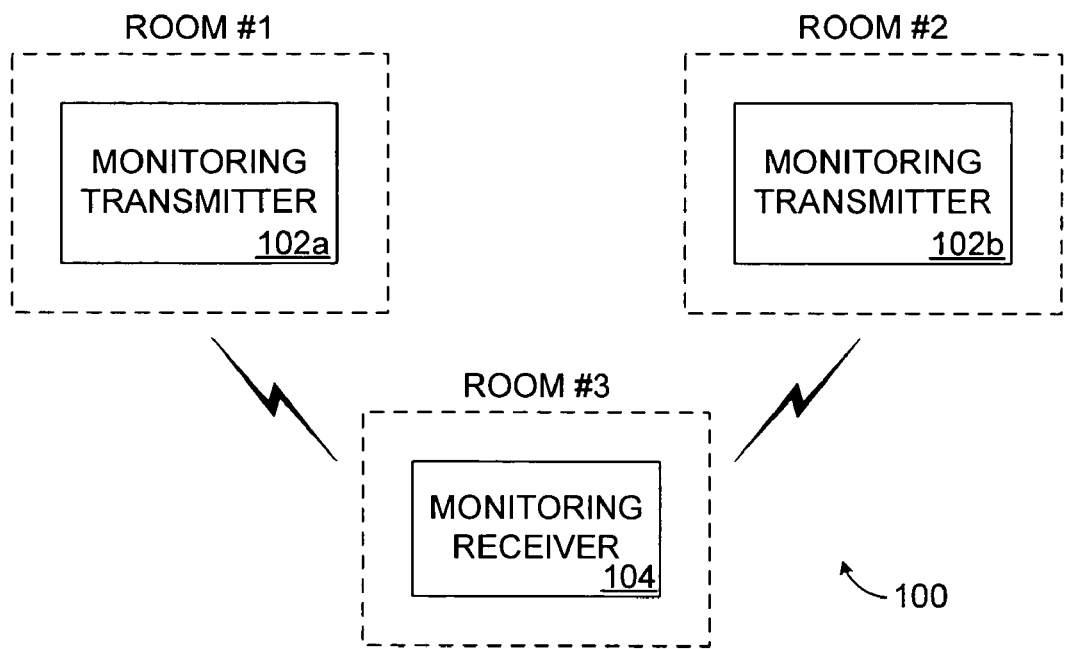
FIG. 1 illustrates an example of a monitoring system for monitoring multiple children according to one embodiment of this disclosure.

FIG. 1 illustrates an example of a monitoring system 100 for monitoring multiple children according to one embodiment of this disclosure. The embodiment of the monitoring system 100 shown in FIG. 1 is for illustration only. Other embodiments of the monitoring system 100 may be used without departing from the scope of this disclosure.

In this embodiment, the monitoring system 100 includes a plurality of monitoring transmitters 102a–102b and a monitoring receiver 104. The monitoring transmitters 102a–102b represent transmitters that are capable of transmitting audio information over a wireless interface. For example, the monitoring transmitters 102a–102b could represent radio frequency transmitters that are capable of transmitting audio information over radio frequency signals. As a particular example, the monitoring transmitters 102a–102b could transmit radio frequency signals throughout at least part of a residence, such as a house or an apartment.

Figure 4:
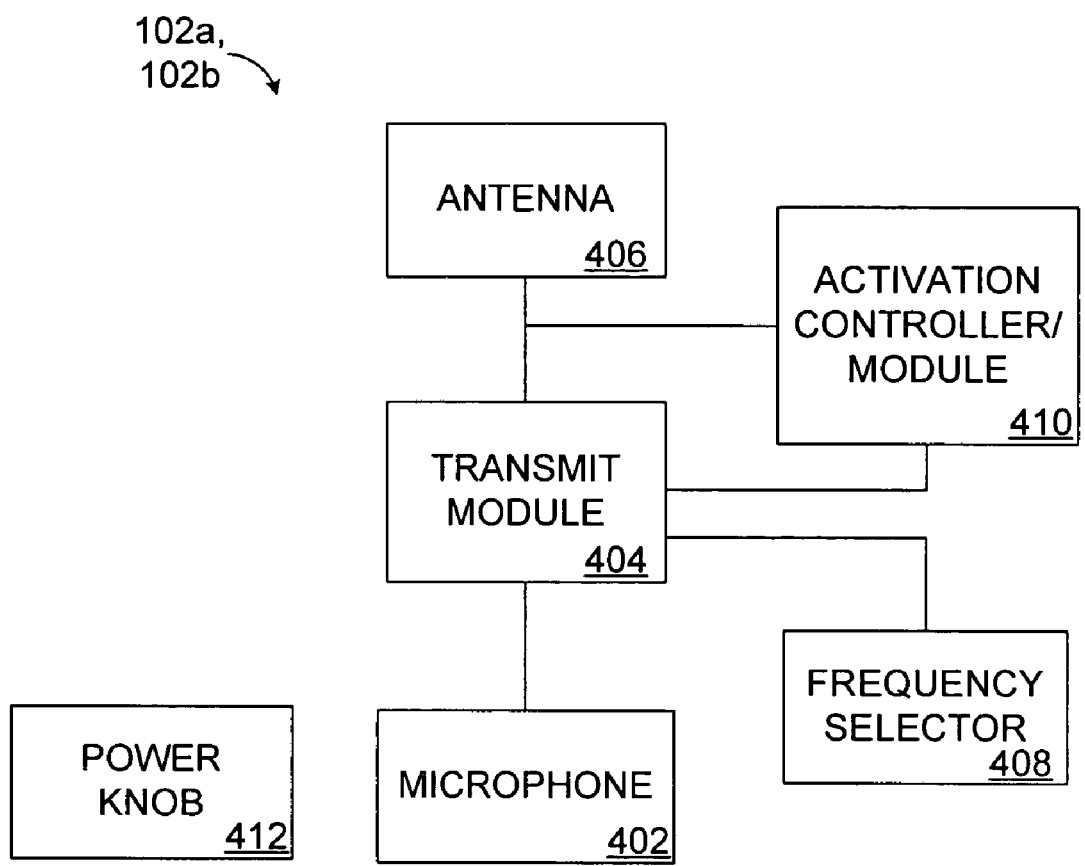
FIG. 4 illustrates an example of a monitoring transmitter for monitoring multiple children according to one embodiment of this disclosure.

Each of the monitoring transmitters 102a–102b includes any hardware, software, firmware, or combination thereof for transmitting audio information. As an example, the monitoring transmitters 102a–102b could represent transmitters placed in nurseries or other locations where children sleep. An example of one embodiment of the monitoring transmitters 102a–102b is shown in FIG. 4, which is described below.

The monitoring receiver 104 is capable of receiving signals transmitted by multiple monitoring transmitters 102a–102b and presenting the transmitted audio information to a user. For example, the monitoring receiver 104 could receive radio frequency signals from multiple monitoring transmitters 102a–102b and extract audio information contained in the radio frequency signals. The monitoring receiver 104 then presents the audio information to the user, such as by playing the audio information on a speaker.

The monitoring receiver 104 simultaneously presents audio information from multiple monitoring transmitters 102a–102b to a user. In this document, the term "simultaneous" and its derivatives means in a manner that at least appears simultaneous. In some embodiments, the monitoring receiver 104 actually receives multiple signals, extracts the audio information, and presents the audio information to the user simultaneously. In other embodiments, the monitoring receiver 104 implements time division multiplexing or another technique where audio information from a single received signal is extracted and/or presented at any instant in time. However, the time division multiplexing or other technique may not be perceptible to the user, and the user believes he or she is hearing audio information from two monitoring transmitters 102a–102b simultaneously.

In some embodiments, the monitoring receiver 104 includes one or multiple visual indicators that provide visual indications of the energy level or "loudness" of the received audio information. For example, the monitoring receiver 104 could include one or more sets of lights, where the color or number of lights illuminated is based on the energy level of the audio information from the monitoring transmitters 102a–102b. In particular embodiments, the monitoring receiver 104 includes a separate visual indicator for each of the monitoring transmitters 102a–102b.

In some embodiments, the monitoring receiver 104 also includes a controller that allows the monitoring receiver 104 to turn the monitoring transmitters 102a–102b on and/or off. For example, when the monitoring receiver 104 is activated, the controller may activate one or more of the monitoring transmitters 102a–102b. Similarly, when the monitoring receiver 104 is deactivated, the controller may deactivate one or more of the monitoring transmitters 102a–102b.

In particular embodiments, the monitoring receiver 104 communicates an activation message (which activates the monitoring transmitters 102a–102b) when the monitoring receiver 104 is activated. The monitoring receiver 104 also communicates a deactivation message (which deactivates the monitoring transmitters 102a–102b) when the monitoring receiver 104 is deactivated.

In other particular embodiments, the monitoring receiver 104 periodically communicates an activation message (which activates the monitoring transmitters 102a–102b and keeps the monitoring transmitters 102a–102b activated) when the monitoring receiver 104 is activated. The monitoring receiver 104 stops communicating the activation messages (which deactivates the monitoring transmitters 102a–102b after a specified amount of time) when the monitoring receiver 104 is deactivated. In this way, the monitoring transmitters 102a–102b are not transmitting audio information when the monitoring receiver 104 is incapable of presenting the audio information to a user. In these embodiments, the monitoring transmitters 102a–102b may include controllers that detect activation and/or deactivation signals from the monitoring receiver 104 and activate and/or deactivate the monitoring transmitters 102a–102b.

Figure 2:
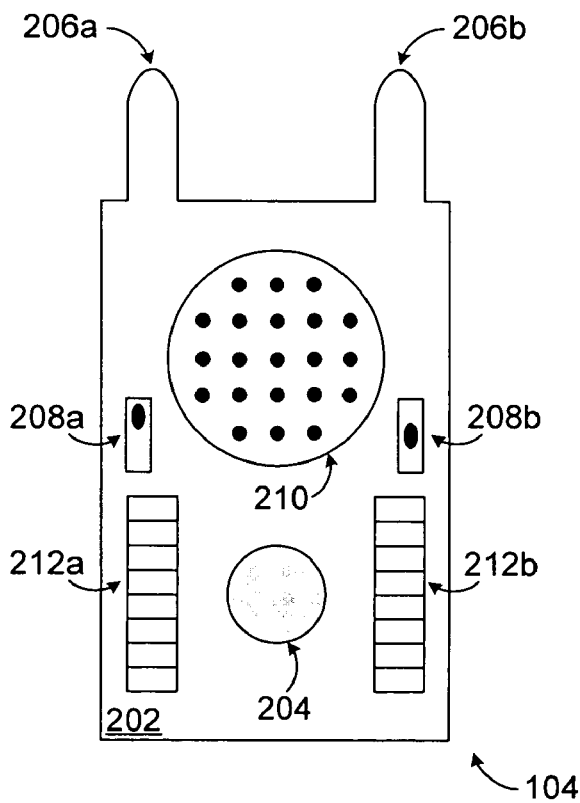
FIG. 2 illustrates an example of a monitoring receiver for monitoring multiple children according to one embodiment of this disclosure.
Figure 3:
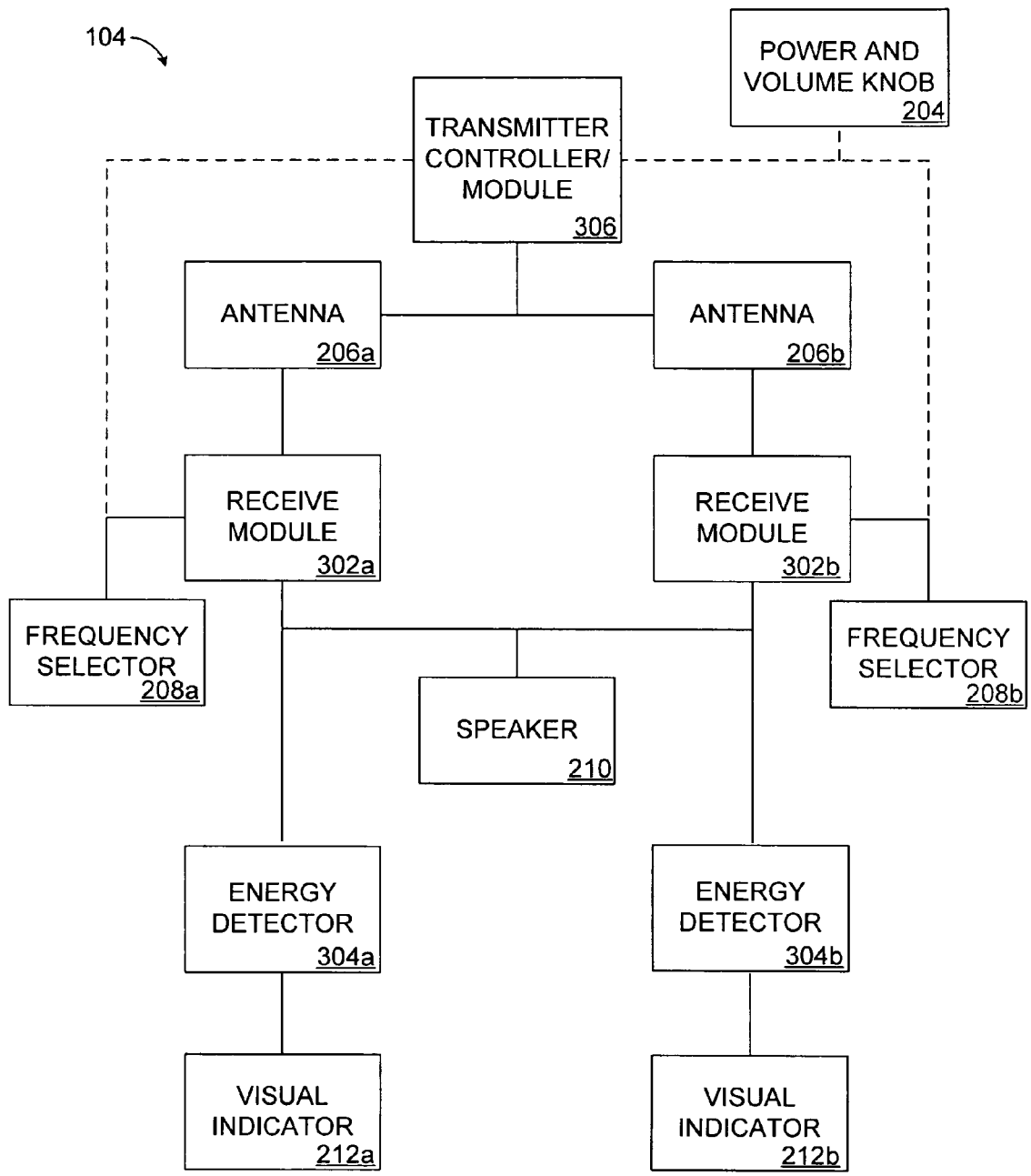
FIG. 3 illustrates additional details of an example of a monitoring receiver for monitoring multiple children according to one embodiment of this disclosure.

The monitoring receiver 104 includes any hardware, software, firmware, or combination thereof for receiving and presenting audio information from multiple transmitters 102a–102b in a simultaneous manner. For example, the monitoring receiver 104 could represent a portable unit that is easily transported from one room to another in a residence. An example of one embodiment of the monitoring receiver 104 is shown in FIGS. 2 and 3, which are described below.

As a particular example of the monitoring system 100, the monitoring transmitters 102a–102b could represent baby monitor transmitters placed in different bedrooms where babies or other young children usually sleep. The monitoring receiver 104 could represent a baby monitor receiver placed in a bedroom where the children's parents usually sleep. The monitoring receiver 104 receives and presents audio information from the multiple transmitters 102a–102b in a simultaneous manner to the parents. This allows the parents to monitor multiple children using a single monitoring receiver 104.

The use of a monitoring receiver 104 that simultaneously receives and presents audio information from multiple transmitters 102a–102b provides several benefits over conventional children's monitors. For example, conventional children's monitors typically include receivers that are capable of effectively receiving audio information from only a single transmitter at a time. As a result, if multiple children are to be monitored, parents of the children typically need to use multiple receivers, one for each child to be monitored.

The monitoring transmitters 102a–102b and the monitoring receiver 104 may communicate in any suitable manner. For example, the monitoring transmitters 102a–102b and the monitoring receiver 104 may communicate using radio frequency signals. Also, the monitoring receiver 104 may use any suitable technique to distinguish between communications from the monitoring transmitters 102a–102b. As an example, each of the monitoring transmitters 102a–102b may communicate using a different frequency, and the monitoring receiver 104 is capable of receiving signals at both frequencies. As another example, the monitoring transmitters 102a–102b may use time division, frequency division, code division, or any other or additional techniques for communicating with the monitoring receiver 104. In addition, communications from each of the monitoring transmitters 102a–102b may be encoded or otherwise secured. This may be useful, for example, in preventing neighbors from intercepting the transmissions from the monitoring transmitters 102a–102b.

Although FIG. 1 illustrates one example of a monitoring system 100 for monitoring multiple children, various changes may be made to FIG. 1. For example, while FIG. 1 illustrates the use of two monitoring transmitters 102a–102b, the monitoring receiver 104 could be capable of receiving and presenting audio information from more than two monitoring transmitters. Also, the monitoring receiver 104 need not always receive and present audio information from multiple monitoring transmitters 102a–102b, such as when parents wish to monitor only a single child at a particular time. In addition, while FIG. 1 illustrates a single monitoring receiver 104, multiple monitoring receivers could be used to receive signals from the monitoring transmitters 102a–102b. This may allow, for example, one monitoring receiver 104 to be used in a parent's bedroom and another monitoring receiver 104 to be used in a living area or study.

FIG. 2 illustrates an example of a monitoring receiver 104 for monitoring multiple children according to one embodiment of this disclosure. The embodiment of the monitoring receiver 104 shown in FIG. 2 is for illustration only. Other embodiments of the monitoring receiver 104 may be used without departing from the scope of this disclosure.

In this embodiment, the monitoring receiver 104 includes a housing 202. The housing 202 provides protection and support for the other components in the monitoring receiver 104. The housing 202 represents any suitable structure capable of protecting and housing the other components in the monitoring receiver 104. As an example, the housing 202 may represent a plastic housing.

The monitoring receiver 104 also includes a power and volume knob 204. The power and volume knob 204 allows a user to turn the monitoring receiver 104 on and off. Power may be supplied to the monitoring receiver 104 in any suitable manner, such as using a battery, an alternating current ("AC") power supply, or any other or additional power source. The power and volume knob 204 also allows the user to control the volume of audio information presented by the monitoring receiver 104. For example, the power and volume knob 204 may allow the user to control the volume of audio information played on a speaker. In some embodiments, the power and volume knob 204 allows a user to turn the volume of the speaker completely down, preventing the audio information from being heard by the user. In other embodiments, the power and volume knob 204 prevents the user from turning the volume of the speaker down below a minimum volume. The power and volume knob 204 represents any suitable structure capable of allowing a user to control the power and volume of the monitoring receiver 104. In other embodiments, the power and the volume of the monitoring receiver 104 may be controlled by separate controls.

The monitoring receiver 104 further includes one or more antennas 206a–206b. The antennas 206a–206b allow the monitoring receiver 104 to receive signals transmitted by the monitoring transmitters 102a–102b. Each of the antennas 206a–206b represents any suitable structure capable of receiving wireless signals from one or more of the monitoring transmitters 102a–102b. For example, the antennas 206a–206b could represent radio frequency antennas. While FIG. 2 illustrates the use of two antennas 206a–206b, the monitoring receiver 104 could use any number of antennas.

The monitoring receiver 104 also includes one or more frequency selectors 208a–208b. The frequency selectors 208a–208b allow a user to select the frequency to be used by the monitoring receiver 104 to receive audio information from the monitoring transmitters 102a–102b. For example, each of the monitoring transmitters 102a–102b could transmit audio information on one of two or more user-selectable frequencies. The frequency selectors 208a–208b allow the user to identify the frequency or frequencies used by the monitoring transmitters 102a–102b, which tunes the monitoring receiver 104 to the appropriate frequency or frequencies. In addition, each of the frequency selectors 208a–208b could have a setting that prevents the monitoring receiver 104 from presenting audio information to the user for a particular monitoring transmitter. In this way, the monitoring receiver 104 can be configured to present audio information from none, one, or both of the monitoring transmitters 102a–102b. This allows, for example, a user to hear audio information from one of the monitoring transmitters 102a–102b but not the other. The frequency selectors 208a–208b represent any suitable structures capable of selecting a frequency for the monitoring receiver 104.

The monitoring receiver 104 further includes a speaker 210. The speaker 210 is capable of presenting audio information received from the monitoring transmitters 102a–102b to a user. For example, the speaker 210 may present audio information collected by the monitoring transmitters 102a–102b in multiple bedrooms where children are sleeping. The speaker 210 represents any suitable structure capable of presenting audio information. While FIG. 2 illustrates a single speaker 210 in the monitoring receiver 104, the monitoring receiver 104 could include multiple speakers, such as one speaker corresponding to each of the monitoring transmitters 102a–102b.

In addition, the monitoring receiver 104 includes one or multiple visual indicators 212a–212b. The visual indicators 212a–212b provide a visual indication of the energy level or loudness of the audio information received from the monitoring transmitters 102a–102b. For example, each of the visual indicators 212a–212b could include a set of lights, and the number of lights illuminated may vary based on the energy level of the audio information from each of the monitoring transmitters 102a–102b. As a particular example, lower energy levels may result in fewer illuminated lights, while higher energy levels may result in more illuminated lights.

In some embodiments, the monitoring receiver 104 includes multiple visual indicators 212a–212b. In particular embodiments, each of the visual indicators 212a–212b identifies the energy level of audio information from one of the monitoring transmitters 102a–102b.

In other embodiments, the monitoring receiver 104 includes a single visual indicator (such as indicator 212a) capable of identifying the energy level of audio information from multiple monitoring transmitters 102a–102b. For example, the visual indicator 212a could use different colors to represent the different monitoring transmitters 102a–102b. As another example, the visual indicator 212a could identify the total or collective energy level of audio information from multiple monitoring transmitters 102a–102b.

Other types of visual indicators 212a–212b could be used in the monitoring receiver 104. Also, while FIG. 2 illustrates arrays of rectangular lights in the visual indicators 212a–212b, the visual indicators 212a–212b could include any number, arrangement, and shape of lights. For example, lights corresponding to lower energy levels could be smaller than lights corresponding to higher energy levels.

The use of different visual indications (whether created by a single visual indicator 212a or multiple visual indicators 212a–212b) simplifies use of the monitoring receiver 104. For example, parents may more quickly identify which of multiple children is making loud noises such as crying loudly.

Each of the visual indicators 212a–212b includes any suitable structure capable of providing visual indications of the energy levels of received audio information. For example, each of the visual indicators 212a–212b may include multiple light emitting diodes ("LEDs") or other lights. In this document, the term "light" refers to any element capable of generating visible light.

Although FIG. 2 illustrates one example of a monitoring receiver 104 for monitoring multiple children, various changes may be made to FIG. 2. For example, the monitoring receiver 104 could include any other or additional components.

FIG. 3 illustrates additional details of an example of a monitoring receiver 104 for monitoring multiple children according to one embodiment of this disclosure. The embodiment of the monitoring receiver 104 shown in FIG. 3 is for illustration only. Other embodiments of the monitoring receiver 104 may be used without departing from the scope of this disclosure.

In this example, the antennas 206a–206b are coupled to receive modules 302a–302b, respectively. The receive modules 302a–302b are capable of receiving and processing incoming signals transmitted by the monitoring transmitters 102a–102b and received by the antennas 206a–206b. For example, the receive modules 302a–302b may receive radio frequency signals and extract audio information contained in the radio frequency signals. As a particular example, each of the receive modules 302a–302b may include components such as filters, amplifiers, and demodulators. In some embodiments, each of the receive modules 302a–302b is capable of extracting audio information from different radio frequencies. In other embodiments, the receive modules 302a–302b are capable of extracting audio information in any other suitable manner. Also, in particular embodiments, the receive modules 302a–302b filter out sounds such as sounds above a threshold pitch in the audio signals. This prevents, for example, high pitched noises caused by interference from being presented to a user.

The receive modules 302a–302b provide the extracted audio information to the speaker 210. The speaker 210 then plays the audio information for the user of the monitoring receiver 104. In some embodiments, the speaker 210 is capable of receiving two or more separate signals containing audio information at the same time. In other embodiments, a combiner could be provided in the monitoring receiver 104 to combine two or more separate signals containing audio information into a single signal. The single signal is then provided to the speaker 210. In still other embodiments, multiple speakers 210 could be used in the monitoring receiver 104.

The receive modules 302a–302b also provide the extracted audio information to energy detectors 304a–304b. The energy detectors 304a–304b identify the energy levels of the extracted audio information from the receive modules 302a–302b, respectively. For example, the energy detectors 304a–304b may identify the amplitudes of the extracted audio information.

The energy detectors 304a–304b also output signals that control the visual indicators 212a–212b. For example, the energy detectors 304a–304b may generate signals that cause some of the lights in the visual indicators 212a–212b to illuminate when the energy level is low. The energy detectors 304a–304b may also generate signals that cause many of the lights in the visual indicators 212a–212b to illuminate when the energy level is high. The energy detectors 304a–304b include any suitable structure capable of identifying the energy levels of extracted audio information and controlling the visual indicators 212a–212b.

In this example, the receive modules 302a–302b are tuned to particular frequencies by the frequency selectors 208a–208b. The frequency selectors 208a–208b may also deactivate the receive modules 302a–302b. In this way, the user may control which of the receive modules 302a–302b are operating in the monitoring receiver 104.

In some embodiments, the monitoring receiver 104 may be capable of activating and/or deactivating the monitoring transmitters 102a–102b. In these embodiments, the monitoring receiver 104 includes a transmitter controller and transmit module 306. The transmitter controller and transmit module 306 detects when the monitoring receiver 104 has been activated and/or deactivated. For example, the transmitter controller and transmit module 306 may detect when the power and volume knob 204 is turned to a position other than an "off" position. The transmitter controller and transmit module 306 may then generate and transmit an activation message to the monitoring transmitters 102a–102b through the antennas 206a–206b. The transmitter controller and transmit module 306 may also detect when the power and volume knob 204 is turned to the "off" position and then transmit a deactivation message to the monitoring transmitters 102a–102b. As another example, as described above, the frequency selectors 208a–208b may activate and tune the receive modules 302a–302b to a particular frequency or deactivate the receive modules 302a–302b. The transmitter controller and transmit module 306 may detect when individual frequency selectors 208a–208b are set to activate and/or deactivate individual receive modules 302a–302b, and the transmitter controller and transmit module 306 may then transmit activation and/or deactivation messages to control individual monitoring transmitters 102a–102b. As yet another example, the transmitter controller and transmit module 306 may detect when the monitoring receiver 104 is activated and transmit activation signals at a specified interval. The transmitter controller and transmit module 306 may then stop transmitting activation signals when the monitoring receiver 104 is deactivated. The transmitter controller and transmit module 306 includes any hardware, software, firmware, or combination thereof for controlling the monitoring transmitters 102a–102b.

A similar technique could be used by the monitoring receiver 104 to control the frequency or frequencies used by the monitoring transmitters 102a–102b. For example, the transmitter controller and transmit module 306 could identify the frequency or frequencies selected by the frequency selectors 208a–208b and then transmit frequency selection signals to the monitoring transmitters 102a–102b. As another example, the transmitter controller and transmit module 306 could receive frequency selection signals identifying the frequency or frequencies used by the monitoring transmitters 102a–102b, and the transmitter controller and transmit module 306 may tune the receive modules 302a–302b accordingly. In this way, the monitoring transmitters 102a–102b and the monitoring receiver 104 may be synchronized to the appropriate frequency or frequencies.

Although FIG. 3 illustrates additional details of one example of a monitoring receiver 104 for monitoring multiple children, various changes may be made to FIG. 3. For example, while FIG. 3 illustrates the use of two antennas 206a–206b, two receive modules 302a–302b, two energy detectors 304a–304b, and two visual indicators 212a–212b, the monitoring receiver 104 could include any number of antennas, receive modules, energy detectors, and visual indicators. Also, the monitoring receiver 104 need not include the transmitter controller and transmit module 306. In addition, the functional division of FIG. 3 is for illustration only. Various components in FIG. 3 may be combined or omitted and additional components could be added. As an example, various components shown in FIG. 3 could be implemented within the same component, such as a microprocessor or microcontroller.

FIG. 4 illustrates an example of a monitoring transmitter 102a–102b for monitoring multiple children according to one embodiment of this disclosure. The embodiment of the monitoring transmitter 102a–102b shown in FIG. 4 is for illustration only. Other embodiments of the monitoring transmitter 102a–102b may be used without departing from the scope of this disclosure.

In this embodiment, the monitoring transmitter 102a–102b includes a microphone 402. The microphone 402 captures audible sounds in a room or other location where the monitoring transmitter 102a–102b is placed. For example, the microphone 402 may capture audible sounds in a nursery or child's bedroom. The microphone 402 represents any suitable structure capable of capturing audible sounds.

A transmit module 404 is coupled to the microphone 402. The transmit module 404 receives the audio information captured by the microphone 402. The transmit module 404 also prepares the audio information for transmission to the monitoring receiver 104. For example, the transmit module 404 may include filters, amplifiers, and modulators for generating radio frequency signals containing the audio information.

An antenna 406 is coupled to the transmit module 404. The antenna 406 allows the monitoring transmitter 102a–102b to transmit signals to the monitoring receiver 104. The antenna 406 represents any suitable structure capable of transmitting wireless signals, such as a radio frequency antenna.

A frequency selector 408 is coupled to the transmit module 404. The frequency selector 408 allows a user to select the frequency used by the monitoring transmitter 102a–102b to transmit audio information to the monitoring receiver 104. The frequency selector 408 represents any suitable structures capable of selecting a frequency for the monitoring transmitter 102a-102.

An activation controller and receive module 410 is coupled to the transmit module 404 and the antenna 406. The activation controller and receive module 410 is capable of activating and deactivating the transmit module 404 based on signals received from the monitoring receiver 104. For example, the activation controller and receive module 410 may receive a signal indicating that the monitoring receiver 104 is turned off or that a frequency selector 208a–208b has deactivated a receive module 302a–302b. The activation controller and receive module 410 may then deactivate the transmit module 404. Similarly, the activation controller and receive module 410 may receive a signal indicating that the monitoring receiver 104 is turned on or that a frequency selector 208a–208b has activated a receive module 302a–302b. The activation controller and receive module 410 may then activate the transmit module 404. In other embodiments, the activation controller and receive module 410 may periodically receive activation signals when the monitoring receiver 104 is activated and stop receiving the activation signals when the monitoring receiver 104 is deactivated. In this way, the monitoring transmitter 102a–102b does not transmit audio information when the monitoring receiver 104 is not going to present the audio information.

A similar technique could be used to control the frequency used by the transmit module 404. For example, the activation controller and receive module 410 could receive a frequency selection signal from the transmit module 404 and set the transmit module 404 to the identified frequency. In this way, the monitoring transmitters 102a–102b and the monitoring receiver 104 may be synchronized to the appropriate frequency or frequencies.

In some embodiments, the monitoring transmitter 102a–102b also includes a power knob 412, which also controls whether the transmit module 404 is activated. In particular embodiments, the activation controller and receive module 410 is also controlled by the power knob 412. If the power knob 412 is turned off, the entire monitoring transmitter 102a–102b is deactivated. If the power knob 412 is turned on, the activation controller and receive module 410 may activate and deactivate the transmit module 404.

The activation controller and receive module 410 includes any hardware, software, firmware, or combination thereof for controlling the monitoring transmitter 102a–102b.

Although FIG. 4 illustrates one example of a monitoring transmitter 102a–102b for monitoring multiple children, various changes may be made to FIG. 4. For example, the monitoring transmitter 102a–102b need not include the activation controller and receive module 410. Also, the functional division of FIG. 4 is for illustration only. Various components in FIG. 4 may be combined or omitted and additional components could be added. As an example, various components shown in FIG. 4 could be implemented within the same component, such as a microprocessor or microcontroller.

Figure 5:
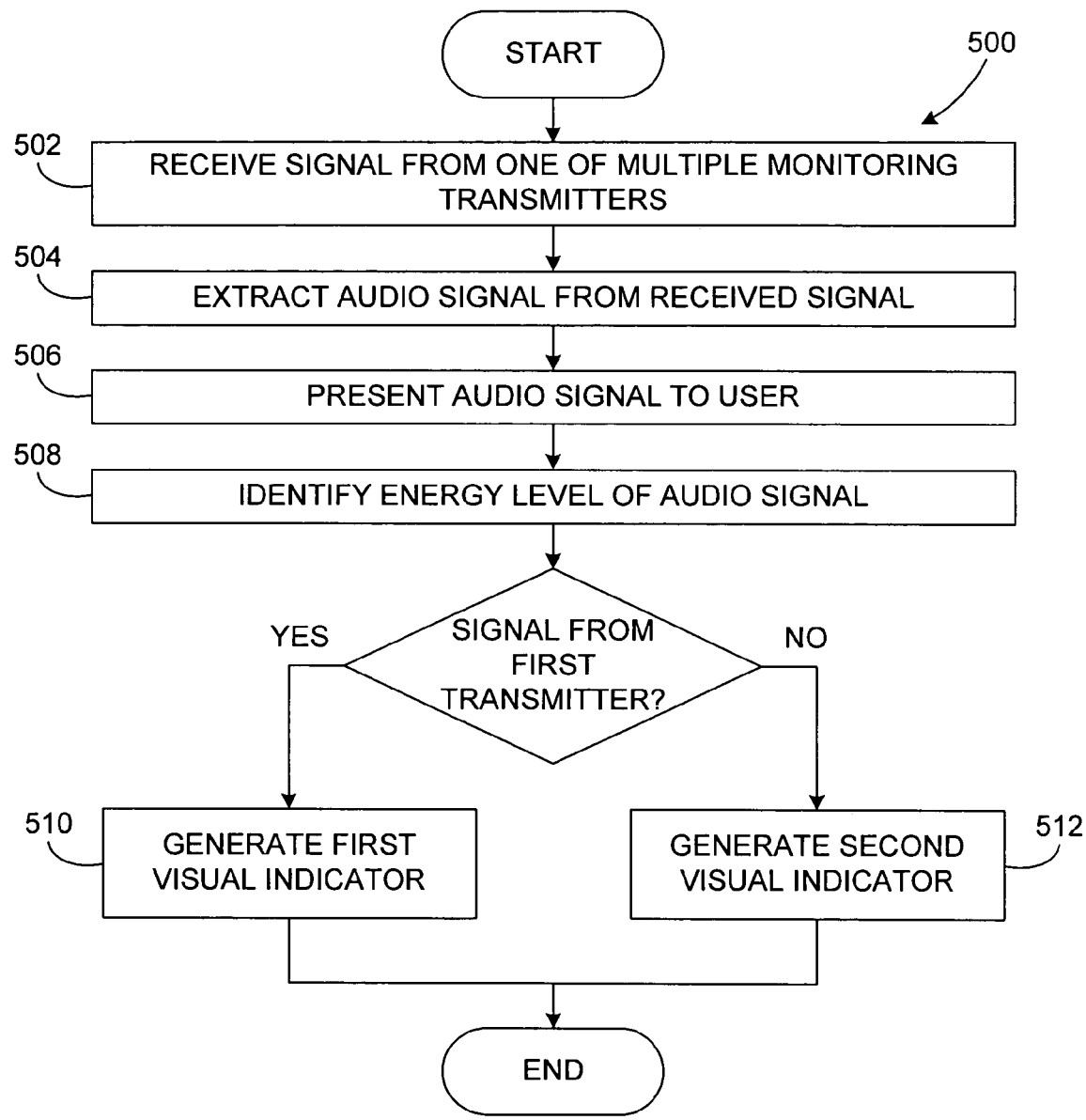
FIG. 5 illustrates an example of a method for monitoring multiple children according to one embodiment of this disclosure.

FIG. 5 illustrates an example of a method 500 for monitoring multiple children according to one embodiment of this disclosure. For ease of explanation, the method 500 is described with respect to the monitoring receiver 104 of FIGS. 2 and 3 operating in the system 100 of FIG. 1. The method 500 could be used by any other suitable receiver and in any other suitable system.

The monitoring receiver 104 receives a signal from one of multiple monitoring transmitters 102a–102b at step 502. This may include, for example, one or more of the antennas 206a–206b receiving signals, such as radio frequency signals, from one of the monitoring transmitters 102a–102b.

The monitoring receiver 104 extracts audio information from the received signal at step 504. This may include, for example, the receive modules 302a–302b receiving the incoming signals. This may also include the receive modules 302a–302b filtering the received signal to determine if the received signal falls within a frequency range associated with the receive modules 302a–302b. This may further include one of the receive modules 302a–302b extracting audio information from the received signal.

The monitoring receiver 104 presents the extracted audio information to a user at step 506. This may include, for example, the receive modules 302a–302b presenting the extracted audio information to a speaker 210.

The monitoring receiver 104 identifies an energy level of the extracted audio information at step 508. This may include, for example, one of the energy detectors 304a–304b measuring the energy level of the extracted audio information. As a particular example, this may include one of the energy detectors 304a–304b measuring the amplitude of the extracted audio information.

If the received signal is transmitted by a first monitoring transmitter 102a, the monitoring receiver 104 generates a first visual indicator at step 510. This may include, for example, the energy detector 304a generating control signals causing the first visual indicator 212a to illuminate one or more lights, where the color or number of lights is based on the identified energy level. Otherwise, the received signal is transmitted by a second monitoring transmitter 102b, and the monitoring receiver 104 generates a second visual indicator at step 512. This may include, for example, the energy detector 304b generating control signals causing the second visual indicator 212b to illuminate one or more lights, where the color or number of lights is based on the identified energy level.

At this point, the method 500 shown in FIG. 5 ends, and the monitoring receiver 104 may perform any suitable action. For example, the monitoring receiver 104 could repeat the method 500 to receive and process additional audio information.

Although FIG. 5 illustrates one example of a method 500 for monitoring multiple children, various changes may be made to FIG. 5. For example, while FIG. 5 illustrates the generation of two visual indications, the monitoring receiver 104 could generate any number of visual indications. Also, various steps shown in FIG. 5 may be performed simultaneously by multiple components in the monitoring receiver 104. As a particular example, multiple receive modules 302a–302b could receive signals from the monitoring transmitters 102a–102b and extract audio information in parallel. Also, the energy detectors 304a–304b could measure the energy levels of the extracted audio information from the monitoring transmitters 102a–102b in parallel. In addition, the visual indicators 212a–212b could generate the first and second visual indications in parallel. In this way, the monitoring receiver 104 may simultaneously receive and present audio information from multiple monitoring transmitters 102a–102b.

Figure 6:
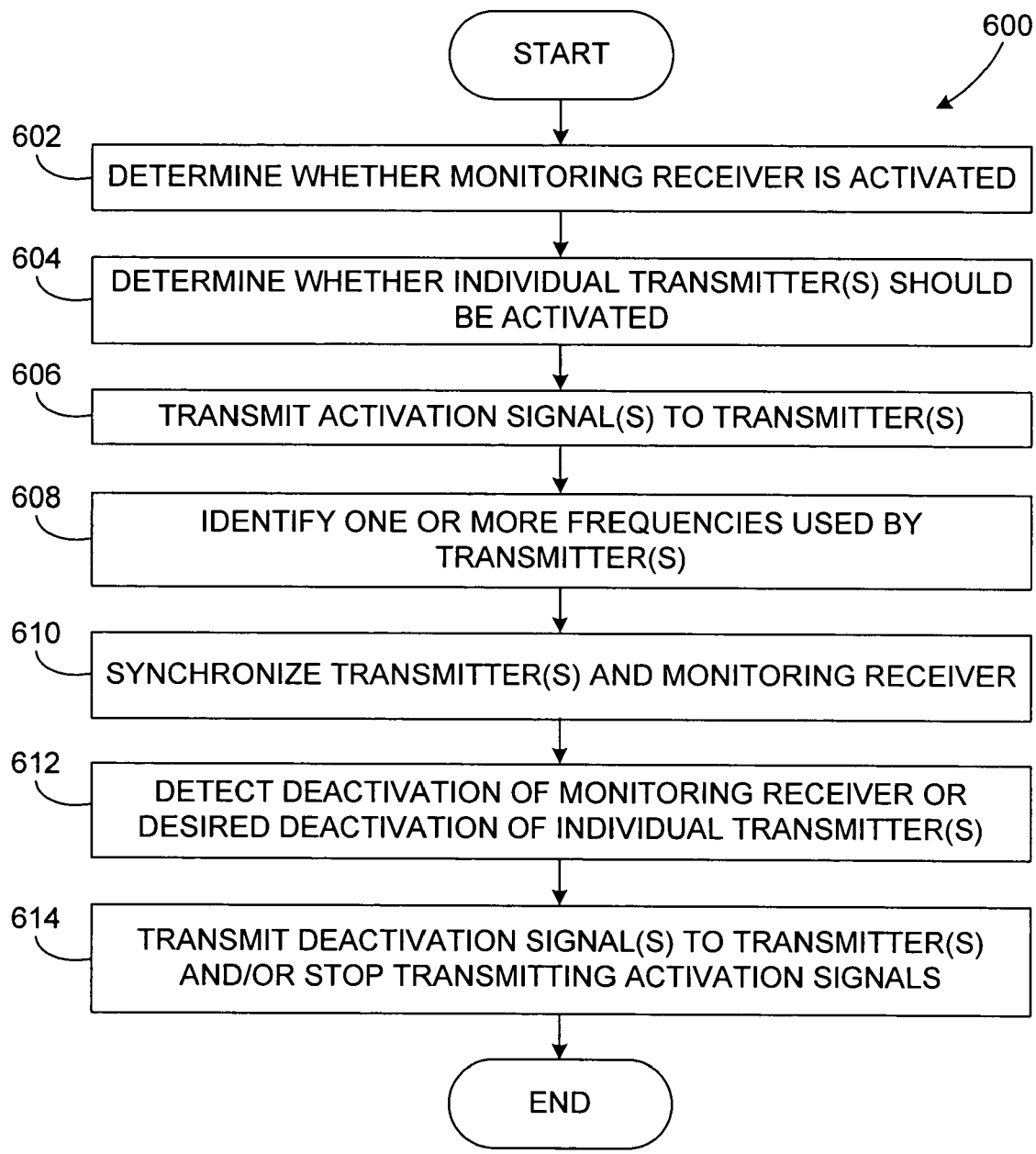
FIG. 6 illustrates an example of a method for controlling monitoring transmitters at a receiver according to one embodiment of this disclosure.

FIG. 6 illustrates an example of a method 600 for controlling monitoring transmitters 102a–102b according to one embodiment of this disclosure. For ease of explanation, the method 600 is described with respect to the monitoring receiver 104 of FIGS. 2 and 3 operating in the system 100 of FIG. 1. The method 600 could be used by any other suitable receiver and in any other suitable system.

The monitoring receiver 104 determines whether it has been activated at step 602. This may include, for example, the transmitter controller and transmit module 306 detecting that the power and volume knob 204 has been moved out of the "off" position to a position that supplies power to the monitoring receiver 104. In this case, the monitoring receiver 104 is said to operate in an activated or enabled state.

The monitoring receiver 104 determines whether an individual one of the monitoring transmitters 102a–102b should be activated at step 604. This may include, for example, the transmitter controller and transmit module 306 detecting that one of the frequency selectors 208a–208b has been set to activate one of the receive modules 302a–302b and tune the receive module to a particular frequency. In this case, one of the receive modules 302a–302b is said to operate in an activated or enabled state.

The monitoring receiver 104 transmits an activation signal to the individual monitoring transmitter 102a–102b at step 606. This may include, for example, the transmitter controller and transmit module 306 generating an activation signal, modulating the activation signal onto a radio frequency signal, and transmitting the activation signal to the monitoring transmitter. This may also include the transmitter controller and transmit module 306 transmitting a single activation signal or multiple activation signals (such as signals transmitted at a specified interval). At this point, the monitoring transmitter 102a–102b receives the activation signal(s), enables its transmit module 404, and transmits audio information to the monitoring receiver 104.

The monitoring receiver 104 identifies one or more frequencies used by the monitoring transmitters 102a–102b at step 608. This may include, for example, the transmitter controller and transmit module 306 receiving one or more frequency selection signals from one or more of the monitoring transmitters 102a–102b. This may also include the transmitter controller and transmit module 306 identifying the frequency or frequencies selected using the frequency selectors 208a–208b.

The monitoring receiver 104 synchronizes the monitoring receiver 104 and the one or more transmitters at step 610. This may include, for example, the transmitter controller and transmit module 306 tuning one or more of the receive modules 302a–302b to the frequency or frequencies identified in the frequency selection signal(s). This may also include the transmitter controller and transmit module 306 transmitting frequency selection signal(s) to one or more of the monitoring transmitters 102a–102b identifying the frequency or frequencies selected using the frequency selectors 208a–208b.

The monitoring receiver 104 detects that it is being deactivated or that the individual monitoring transmitter should be deactivated at step 612. This may include, for example, the transmitter controller and transmit module 306 detecting that the power and volume knob 204 is being turned to the "off" position (the monitoring receiver 104 is entering a deactivated or disabled state) or that one of the frequency selectors 208a–208b is deactivating one of the receive modules 302a–302b (one of the receive modules 302a–302b is entering a deactivated or disabled state).

The monitoring receiver 104 transmits a deactivation signal and/or stops transmitting the activation signal to the individual monitoring transmitter 102a–102b at step 614. This may include, for example, the transmitter controller and transmit module 306 generating a deactivation signal, modulating the deactivation signal onto a radio frequency signal, and transmitting the deactivation signal to the monitoring transmitter. This may also include the transmitter controller and transmit module 306 ceasing to transmit activation signals at the specified interval. At this point, the monitoring transmitter receives the deactivation signal or ceases to receive the activation signals at the specified interval, disables its transmit module 404, and stops transmitting audio information to the monitoring receiver 104.

Although FIG. 6 illustrates one example of a method 600 for controlling monitoring transmitters 102a–102b, various changes may be made to FIG. 6. For example, the monitoring receiver 104 could enable all of the monitoring transmitters 102a–102b when it is activated and disable all of the monitoring transmitters 102a–102b when it is deactivated without individually controlling the monitoring transmitters 102a–102b. Also, while FIG. 6 illustrates both the activation and deactivation of the monitoring transmitters 102a–102b and synchronized frequency selections, either one of these functions could be implemented independent of the other.

Figure 7:
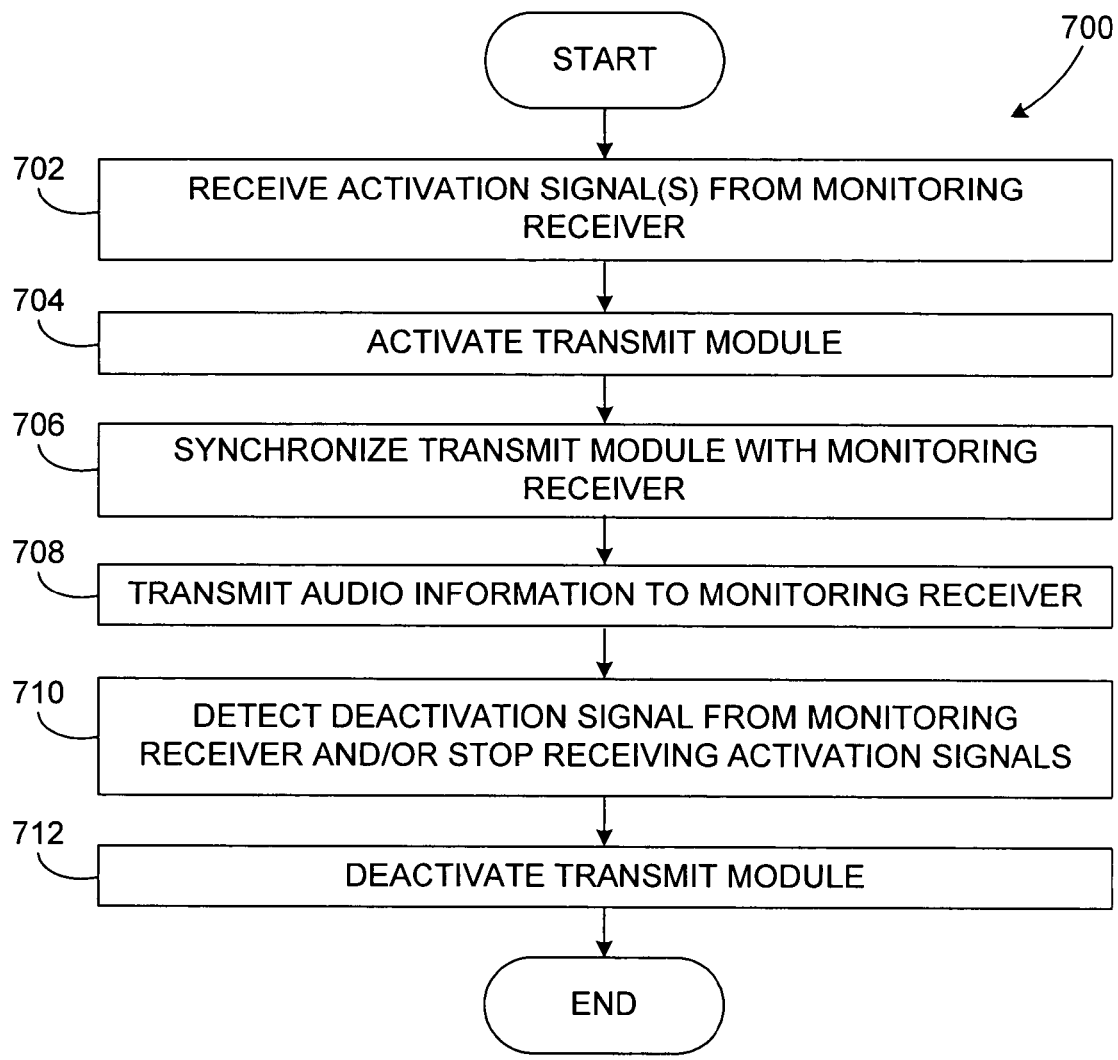
FIG. 7 illustrates an example of a method for monitoring a child at a transmitter according to one embodiment of this disclosure.

FIG. 7 illustrates an example of a method 700 for monitoring a child at a transmitter according to one embodiment of this disclosure. For ease of explanation, the method 700 is described with respect to the monitoring transmitter 102a–102b of FIG. 4 operating in the system 100 of FIG. 1. The method 700 could be used by any other suitable transmitter and in any other suitable system.

The monitoring transmitter 102a–102b receives an activation signal from a monitoring receiver 104 at step 104. This may include, for example, the activation controller and receive module 410 receiving a single activation signal from the monitoring receiver 104 or receiving multiple activation signals (such as multiple signals at a specified interval).

The monitoring transmitter 102a–102b activates the transmit module 404 at step 704. This may include, for example, the activation controller and receive module 410 providing an enable signal to the transmit module 404, providing power to the transmit module 404, or otherwise activating the transmit module 404.

The monitoring transmitter 102a–102b synchronizes the transmit module 404 and the monitoring receiver 104 at step 706. This may include, for example, the activation controller and receive module 410 receiving a frequency selection signal from the monitoring receiver 104 and tuning the transmit module 404 to the appropriate frequency. This may also include the activation controller and receive module 410 transmitting a frequency selection signal identifying the frequency of the transmit module 404 to the monitoring receiver 104.

The monitoring transmitter 102a–102b transmits audio information to the monitoring receiver 104 at step 708. This may include, for example, the transmit module 404 transmitting a radio frequency signal containing the audio information using the frequency selected during synchronization.

The monitoring transmitter 102a–102b receives a deactivation signal and/or stops receiving the activation signal from the monitoring receiver at step 710. This may include, for example, the activation controller and receive module 410 receiving a single deactivation signal or ceasing to receive activation signals at the specified interval. At this point, the monitoring transmitter 102a–102b deactivates the transmit module 404 at step 712. This causes the monitoring transmitter 102a–102b to stop transmitting audio information.

Although FIG. 7 illustrates one example of a method 700 for monitoring a child at a transmitter, various changes may be made to FIG. 7. For example, the monitoring transmitter 102a–102b could include a memory that stores the last frequency used before being deactivated and upon activation begin using that frequency. Also, while FIG. 7 illustrates both the activation and deactivation of the monitoring transmitter 102a–102b and synchronized frequency selections, either one of these functions could be implemented independent of the other.

It may be advantageous to set forth definitions of certain words and phrases used in this patent document. The terms "include" and "comprise," as well as derivatives thereof, mean inclusion without limitation. The term "or" is inclusive, meaning and/or. The term "each" means every one of at least a subset of the identified items. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, or software, or a combination of at least two of the same. It should be noted that the functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of particular embodiments does not define or constrain this disclosure. Other changes, substitutions, and alterations are also possible without departing from the spirit and scope of this disclosure, as defined by the following claims.

What is claimed is:

1. A method for monitoring multiple children, comprising:
    receiving a plurality of signals from a plurality of transmitters, each of the signals comprising audio information;
    extracting the audio information from each of the plurality of signals;
    simultaneously presenting the audio information from each of the plurality of signals to a user; and
    simultaneously providing a plurality of visual indications, each of the visual indications corresponding to an energy level of the audio information associated with one of the plurality of signals.

2. The method of claim 1, wherein simultaneously providing the plurality of visual indications comprises providing a first visual indication and a second visual indication using at least one visual indicator.

3. The method of claim 1, wherein simultaneously providing the plurality of visual indications comprises:
    providing a first visual indication using a first visual indicator, the first visual indicator comprising a first plurality of lights; and
    providing a second visual indication using a second visual indicator, the second visual indicator comprising a second plurality of lights.

4. The method of claim 3, wherein:
    providing the first visual indication comprises causing a first number of the first plurality of lights to illuminate based on an amplitude of the audio information associated with one of the plurality of signals; and
    providing the second visual indication comprises causing a second number of the second plurality of lights to illuminate based on an amplitude of the audio information associated with another of the plurality of signals.

5. The method of claim 1, wherein extracting the audio information comprises simultaneously extracting the audio information from each of the plurality of signals.

6. The method of claim 5, wherein simultaneously extracting the audio information comprises at least one of:
    extracting the audio information from the plurality of signals in a multiplexed manner; and
    extracting the audio information from one of the plurality of signals in parallel with extracting the audio information from another of the plurality of signals.

7. The method of claim 1, wherein:
    the plurality of signals comprise radio frequency signals; and
    receiving the plurality of signals comprises receiving the plurality of signals over at least one radio frequency antenna.

8. The method of claim 7, wherein receiving the plurality of signals comprises allowing a user to select at least one of a plurality of radio frequencies.

9. The method of claim 1, wherein simultaneously presenting the audio information comprises presenting the audio information to one or more speakers for presentation to the user.

10. The method of claim 1, further comprising communicating at least one activation signal to at least one of the transmitters to enable transmission of at least one of the plurality of signals.

11. The method of claim 10, further comprising at least one of:
    stopping the communication of activation signals to at least one of the transmitters to disable transmission of at least one of the plurality of signals; and
    communicating a deactivation signal to at least one of the transmitters to disable transmission of at least one of the plurality of signals.

12. A monitor for monitoring multiple children, comprising:
    at least one antenna capable of receiving a plurality of signals from a plurality of transmitters, each of the signals comprising audio information;
    at least one receive module capable of extracting the audio information from each of the plurality of signals;
    at least one speaker capable of simultaneously presenting the audio information from each of the plurality of signals to a user; and
    at least one visual indicator capable of simultaneously providing a plurality of visual indications, each of the visual indications corresponding to an energy level of the audio information associated with one of the plurality of signals.

13. The monitor of claim 12, wherein the at least one visual indicator is capable of simultaneously providing a first visual indication and a second visual indication.

14. The monitor of claim 12, wherein the at least one visual indicator comprises:
    a first visual indicator capable of providing the first visual indication using a first plurality of lights; and
    a second visual indicator capable of providing the second visual indication using a second plurality of lights.

15. The monitor of claim 14, further comprising at least one energy detector capable of identifying the energy level of the audio information associated with each of the plurality of signals.

16. The monitor of claim 12, wherein:
    the at least one receive module comprises a plurality of receive modules capable of simultaneously extracting the audio information from the plurality of signals; and
    the at least one visual indicator comprises a plurality of visual indicators capable of simultaneously providing the plurality of visual indications.

17. The monitor of claim 16, wherein:
    the plurality of signals comprise radio frequency signals;

the at least one antenna comprises at least one radio frequency antenna; and the plurality of receive modules comprises a plurality of radio frequency receive modules.

18. The monitor of claim 16, further comprising a plurality of frequency selectors capable of selecting at least one of a plurality of radio frequencies used by the receive modules.

19. The monitor of claim 18, wherein the monitor further comprises a controller capable of at least one of:

initiating communication of at least one activation signal to at least one of the transmitters to enable transmission of at least one of the plurality of signals;

stopping the communication of activation signals to at least one of the transmitters to disable transmission of at least one of the plurality of signals; and communicating a deactivation signal to at least one of the transmitters to disable transmission of at least one of the plurality of signals.

20. A monitor for monitoring children, comprising:

at least one antenna capable of receiving at least one signal from at least one transmitter, the at least one signal comprising audio information;

at least one receive module capable of extracting the audio information from the at least one signal;

at least one speaker capable of presenting the audio information to a user;

at least one frequency selector capable of selecting at least one of a plurality of frequencies used by the at least one receive module and disabling the at least one receive module; and a controller capable of at least one of:

initiating communication of an activation signal to at least one transmitter to enable transmission of at least one signal;

stopping the communication of activation signals to at least one transmitter to disable transmission of at least one signal; and communicating a deactivation signal to at least one transmitter to disable transmission of at least one signal.

* * * * *